United States Patent [19]

Carson et al.

[11] Patent Number: 5,682,473
[45] Date of Patent: Oct. 28, 1997

[54] IN-PROCESS INSPECTION

[75] Inventors: Pamlia Lynn Carson, McKinney; Janet Louise Timmons, Dallas, both of Tex.

[73] Assignee: Texas Instruments Incorporated, Dallas, Tex.

[21] Appl. No.: 433,778

[22] Filed: May 3, 1995

[51] Int. Cl.$^6$ .................................................. G06F 11/00
[52] U.S. Cl. .............................. 395/183.14; 364/267.91
[58] Field of Search ..................... 395/183.14, 183.08, 395/183.22; 364/267, 267.91

[56] References Cited

U.S. PATENT DOCUMENTS 5,390,325  2/1995  Miller ............................... 395/183.14

OTHER PUBLICATIONS

Gilb, Tom and Graham, Dorothy, *Software Inspection*, Addison Wesley, 1993, pp. 42-45, 48, 49-66, 75-78, 87-94, 98-100, 103, 105-113, 139-140, 144, 166-170, 172-177, 194-199, and 202-203.

Ebenau, Robert G. and Strauss, Susan H., *Software Inspection Process*, McGraw Hill, 1994, pp. 37-40, 45-46, 48-58, 63-67, 69-70, 79-81, 83-94, 100-101, 150-108, 141-144, 195-282, 295-334.

Freedman, Daniel P. and Weinberg, Gerald M., *Handbook of Walkthroughts, Inspections, and Technical Reviews*, Little Brown Computer System Series, 1982, pp. 239-242.

Gilb, Tom, *Principles of Software Engineering Management*, Addison-Wesley, 1988, pp. 205-224.

Fagan, Michael, "Design and Code Inspections to Reduce Errors in Program Development," IBM Systems Journal, 1976, 15(3), 182-211.

Fagan, Michael, "Inspecting Software Design and Code," Datamation, Oct. 1977, 133-144.

Fagan, Michael, "Advances in Software Inspections," IEEE Transactions on Software Engineering, SE-12 (7), Jul., 744-751.

Jones, C. L., "A Process-Integrated Approach to Defect Prevention," IBM Systems Journal, 1985, 24 (2), 150-167.

G. Russell, "Experience with Inspection in Ultralarge-Scale Developments", IEEE Software, Jan. 1991, pp. 25-31.

Hanna et al., "SQ Engineer—A Methodology and Tool for Specifying and Engineering Software Quality", 1992 Symposium on Assessment of Quality Software Development Tools, pp. 194-210.

(List continued on next page.)

*Primary Examiner*—Robert W. Beausoliel, Jr.
*Assistant Examiner*—Dieu-Minh Le
*Attorney, Agent, or Firm*—Robert L. Troike; W. James Brady, III; Richard L. Donaldson

[57] ABSTRACT

In a document creation stage (54), a document is created using a document generator (37) and then inspected, using a document analyzer (38), in an inspection stage (58). The document is created and inspected in accordance with defect types, defect severities and entry, reinspection and exit evaluation criteria data defined through a user interface (32) in an initialization stage (52). The defined data is stored to a definitions data storage (44) and, before the inspection stage (58) using a document analyzer (38), refined to the particular task document in a planning stage (56) using a refiner (36). During a logging stage (60), defect items are compiled and tallied to an inspection data storage (46) and used, in an inspection data analyzer (40), to make reinspection recommendations and, during a causal analysis stage (62), to generate recommended changes to the inspection processes. Documents are reworked in a rework stage (70) and final tallies are generated. Documents that do not pass a reinspection evaluation in a reinspection stage (64) then repeat the inspection process. The final inspection data and tallies are reported to the user using report generator (42) and stored to the inspection data storage (46) for trend analysis and statistical process control of the document inspection and creation processes.

3 Claims, 2 Drawing Sheets

OTHER PUBLICATIONS

Chaar et al., "On the Evaluation of Software Inspections and Tests," 1993 International Test Conference, pp. 180–189.

Yaung et al., "A Predictive Model for Identifying Inspections with Escaped Defects", 1994 Conference on Computer Software and Applications, pp. 287–292.

Macdonald et al., "A Review of Tool Support for Software Inspection", 1995 Workshop on Computer-Aided Software Engineering, pp. 340–349.

Chaar et al., "In-Process Evaluation for Software Inspection and Test", IEEE Transactions on Software Engineering, vol. 19 No. 11 Nov. 1993, pp. 1055–1070.

Barnard et al., "Managing Code Inspection Information", IEEE Software vol. 11 No. 2 Mar. 1994, pp. 59–69.

Porter et al., "An Experiment to Assess Different Defect Detection Methods for Software Requirements Inspections", 1994 International Conference on Software Engineering, pp. 103–112.

IN-PROCESS INSPECTION

NOTICE: COPYRIGHT© 1994 TEXAS INSTRUMENTS INCORPORATED

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD OF THE INVENTION

The present invention relates in general to inspection processes and in particular to the inspection of documents during their creation, "in-process inspection".

BACKGROUND OF THE INVENTION

Many activities, such as product production activities or software program generation activities, result in the creation of task documents which define the steps and/or resources needed in generating the product. One method of ensuring the quality and consistency of the generated products is to inspect the resulting product, or, in the case of the software program, to execute the resulting program. A growing trend, however, is to inspect the task documents or software program while it is being created and then repeatedly inspect and refine the task document before the final product is generated. This procedure is called "in-process" inspection.

The process of inspecting task documents involves several stages. In prior art inspection processes, these stages include a planning stage, an inspection stage, a logging stage, a causal analysis stage and a results reporting stage.

In the Fagan and Ebenau, et al. (see Michael Fagan, "Design and Code Inspections to Reduce Errors in Program Development," IBM Systems Journal, 1976, 15(3), 182–211, herein incorporated by reference in it's entirety; and see also Robert G. Ebenau and Susan H. Strauss, Software Inspection Process, McGraw Hill, 1994, herein incorporated by reference in it's entirety) inspection processes, there is no causal analysis stage.

In the inspection process as discussed by Carol Jones, et al. and Tom Gilb, et al. (see Carol Jones, et al., "A Process-Integrated Approach to Defect Prevention," IBM Systems Journal, 1985, 24(2), 150–167, herein incorporated by reference in it's entirety; and see also Tom Gilb and Dorothy Graham, Software Inspections, Addison-Wesley, 1993, herein incorporated by reference in it's entirety), the causal analysis stage of the inspection process includes the selection of defects based on the perception of the inspectors, rather than based on data. In the work of Jones et al. and Gilb et al., the defects are categorized into types of defects (defect types) after the defects have been selected. Then, the prior art inspection process continues with recommending process improvements. No assessment of the effectiveness of process changes based on the results of the inspection, however, is made.

Furthermore, in the processes described in the prior art, the points of view from which an inspector approaches the inspection of a document are defined in general terms based on perceptions of customer perspectives. Defect severities are either also defined in general terms or are defined in terms of the perceived costs to detect and rework defects later during actual use of the document as opposed to detecting and reworking at the time the task document is inspected.

SUMMARY OF THE INVENTION

The present invention is a method and system for inspecting task documents while the task documents are "in process".

In a document creation stage, a task document is created. The document is then inspected, using a document analyzer, in an inspection stage in accordance with defect types, defect severities and entry, reinspection and exit evaluation criteria data defined through a user interface in an initiation stage. The defined data is stored to a definitions data storage and, before the inspection stage, refined and customized to the particular task document in a planning stage using a refiner.

During a logging stage, defect items which includes defects, questionable items and suggestions for improvement, are logged and tallied to an inspection data storage. The logged and tallied data is then used, in an inspection data analyzer, to make reinspection recommendations and, during a causal analysis stage, to generate recommended changes to the document creation and inspection processes.

Documents which do not pass inspection are reworked in a rework stage and then reinspected in a reinspection stage. The final inspection data and tallies are reported to the user using report generator and stored to the inspection data storage for trend analysis, statistical process control of the document inspection and creation processes.

BRIEF DESCRIPTION OF THE DRAWINGS

For a better understanding of the present invention, reference may be made to the accompanying drawings, in which.

DETAILED DESCRIPTION OF THE INVENTION

Figure 1:
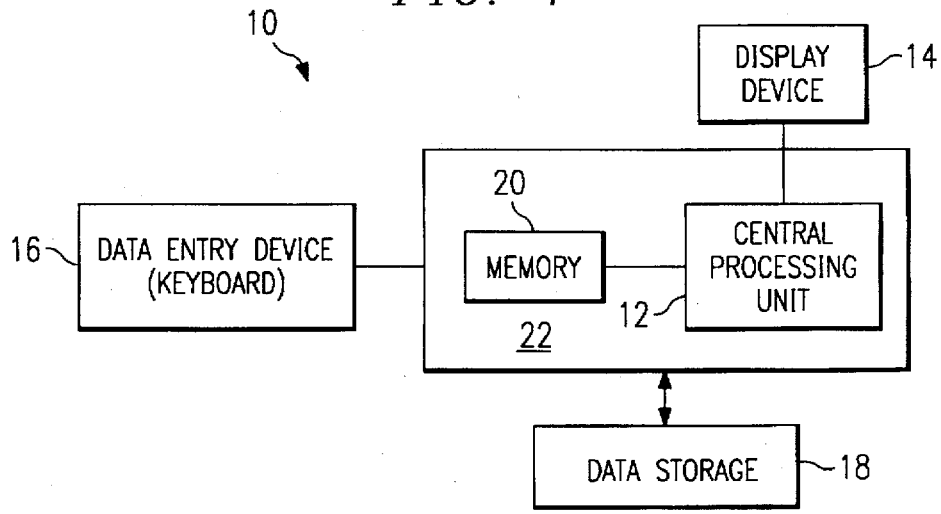
FIG. 1 illustrates an exemplary computer system embodying the present invention.

A system 10 embodying the invention is shown in FIG. 1. The system 10 includes a central processing unit (CPU 12 and at least one memory device 20. The CPU 12 is accessed by an end user via a display device 14 and a data entry device 16. System 10 also is also coupled to a data storage device 18. Operating system 22 controls and enables interaction between the various components of the system 10.

In the preferred embodiment of the invention disclosed herein, the system 10 is implemented using a programmed IBM-compatible personal computer or workstation having a UNIX or DOS operating system 10. Other computers and operating systems may, however, also be used.

Figure 2:
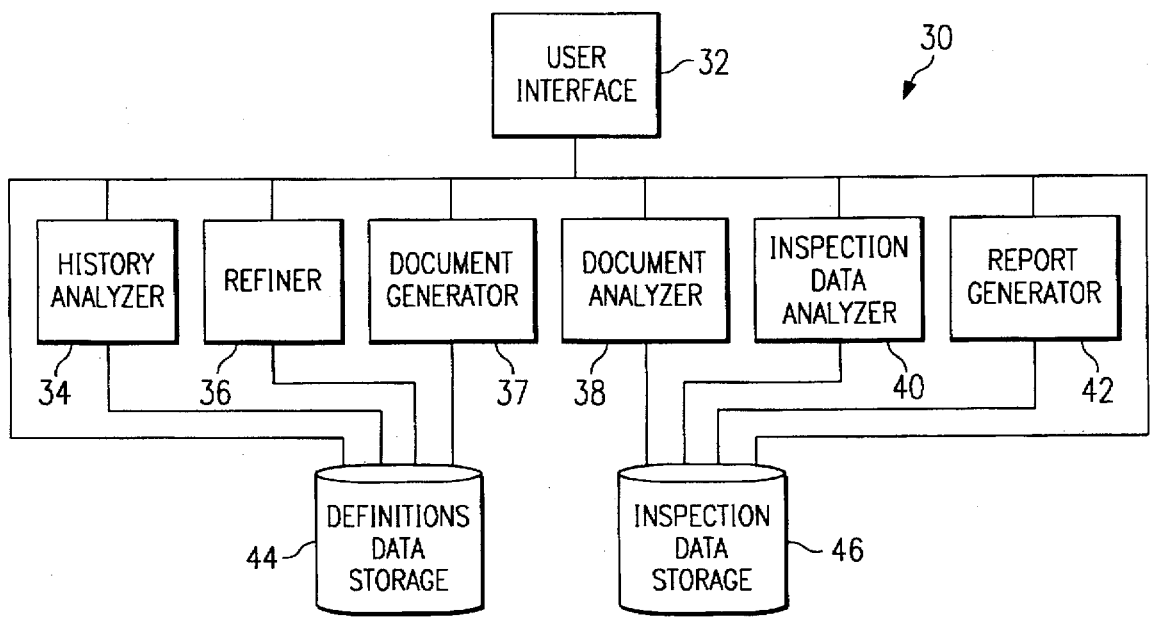
FIG. 2 shows a block diagram illustrating the present invention.

The present invention is a method and system for inspecting documents while the documents are in-process, i.e., still under construction. A block diagram illustrating the present invention is shown in FIG. 2 and includes a user interface 32 coupled to a history analyzer 34, a refiner 36, a document generator 37, a document analyzer 38, an inspection data analyzer 40 and a report generator 42. The user interface 32, the history analyzer 34, the document generator 37 and the refiner 36 are also coupled to a definitions data storage 44. The user interface 32, the document analyzer 38, the inspection data analyzer 40 and the report generator 42 are also coupled to an inspection data storage 46. Although shown in FIG. 2 as two separate storages, it is contemplated that the definitions data storage 44 and the inspection data storage 46 could be implemented as a single data storage.

Figure 3:
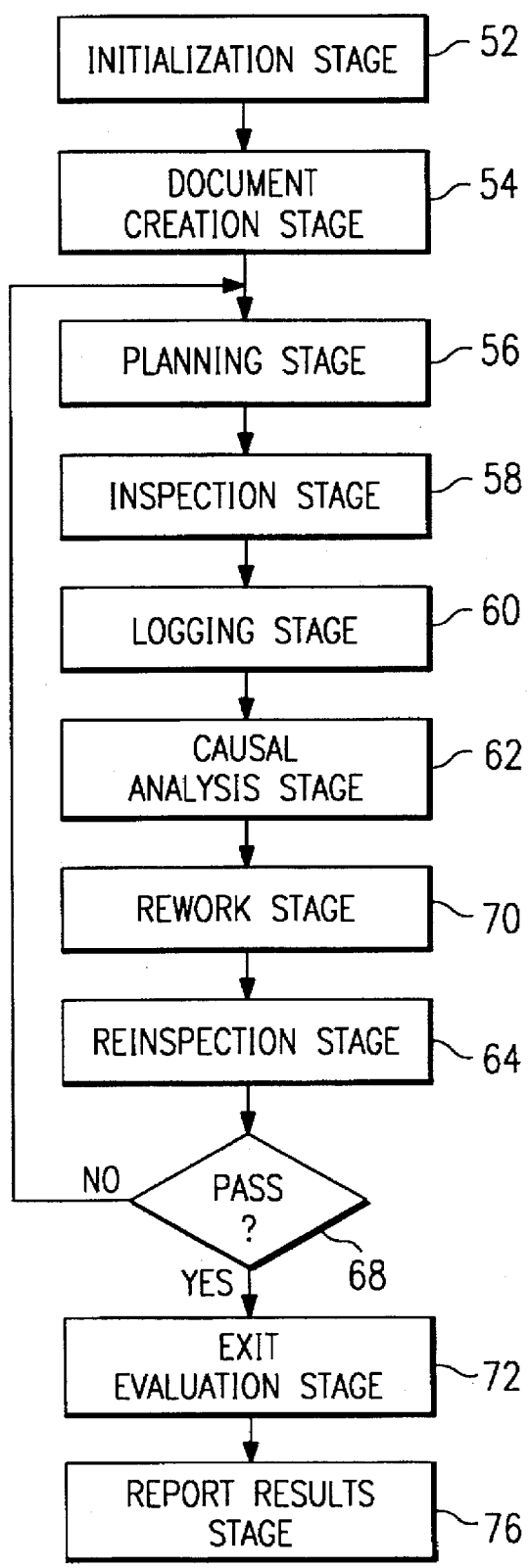
FIG. 3 is a flowchart depicting the operation of the present invention.

FIG. 3 shows a flow diagram which illustrates the operation of the present invention. As shown in FIG. 3, the present invention includes an initialization stage 52, a document creation stage 54, a planning stage 56, an inspection stage 58, a logging stage 60, a causal analysis stage 62, a rework stage 70, a reinspection stage 64, an exit evaluation stage 72 and a report remits stage 76. Each of the stages of the invention are discussed in detail hereinbelow in conjunction with the elements of the block diagram depicted in FIG. 2.

In the initialization stage 52, a user, through the user interface 32, creates defect types, defines in detail defect severities, assigns a default severity to each defect type, creates perspectives to address all the defect types, and creates evaluation criteria. Each of these activities are performed for a particular task document class. The resulting data is stored in the definitions data storage 44 and used in inspecting all task documents which belong to the particular task document class. Each of the steps performed during the initialization stage 52 are described in detail hereinbelow. Each of the steps in the initialization stage 52 are performed by the user, but, it is also contemplated that an expert system could be implemented to perform some or all of the steps.

The first step of the initialization stage 52 is to for the user to define in detail a plurality of defect severities. A defect severity is a classification of an item based on the impact the item could have to the project if the item is not resolved. Exemplary defect severities include critical, major, minor, question, and improvement suggestion and are defined as shown in Table 1 in Appendix A, herein incorporated by reference in it's entirety.

The second step of the initialization stage 52 is for the user to define a plurality of defect types for the particular task document class. A defect type is a category of similar defects that are likely to occur in the task document. Each defect type includes one or more predefined defects which are identified by a unique defect code.

The third step of the initialization stage 52 is for the user to assign a default defect severity to each of the predefined defects. The default defect severity is assigned from the plurality of defect severities discussed hereinabove. Assigning a default defect severity to each of the predefined defects assists the user in understanding what defects are of greater concern and hence more important to detect. Using default defect severities also facilitates consistent and quick assignment of defect severities to detected defects during both the inspection stage 58 and the logging stage 60, discussed in detail hereinbelow. Exemplary defect types with predefined defects, associated defect codes and default defect severities are shown in Table 2 in Appendix B, herein incorporated by reference in it's entirety. The exemplary defect types include clarity, format, graphic, punctuation, spelling, structure, style, technical and wording.

The fourth step of the initialization stage 52 is for the user to define a plurality of perspectives. A perspective is a unique point of view from which the inspection and analysis of the task document is approached. All of the predefined defects are addressed in at least one of the plurality of perspectives. Thus, the predefined defects are referenced in creating the perspectives to ensure that all of the predefined defects are covered. A detailed perspectives checklist is generated in the planning stage 56, discussed in detail hereinbelow, and includes a listing of the predefined defects that an inspector should look for during the inspection stage 58.

Perspective definition items are then generated by the user which associate a defect type, default defect severity, defect code, defect definition and perspective. The perspective definition items are stored in the definition data storage 44 for use in the remaining stages of the inspection process of the present invention. Table 3 in Appendix C, herein incorporated by reference in their entirety, illustrate exemplary perspective definition items.

Defining the defect severities, defect types and perspectives prior to conducting an inspection reduces the effort required during the planning stage 56 of the inspection process, and increases the consistency with which inspectors and authors assign defect types and severities to specific defects. It also provides the authors with a checklist of defects (with defined, default severities) to use as the task document is created and an opportunity to prevent those defects from occurring.

To assist the user in defining defect types, defect definitions, defect severities, and perspectives, in associating default severities with the defined defect types, and in associating defect types and defect definitions with perspectives, the history analyzer 34 is operable to analyze data on defects previously observed for the particular task document class of interest and to determine specific defect types and definitions and associated defect severities that are likely to be found in future documents of the particular task document class. The history analyzer 34 is further operable to produce a set of recommended perspectives which balance the defects among the perspectives and assures that all defect types and defect definitions are addressed.

The fifth step of the initialization stage 52 in the present invention is for the user to create evaluation criteria. The evaluation criteria include entry readiness evaluation criteria, reinspection evaluation criteria and exit evaluation criteria. The entry readiness evaluation criteria define objective criteria that must be satisfied before the target task document can begin the inspection process. The reinspection evaluation criteria define objective conditions (based on the level of quality for the target task document) that must be satisfied before the task document can continue through the inspection process. The exit evaluation criteria define objective conditions that must be satisfied before the target task document can complete the inspection process.

Defining evaluation criteria prior to conducting an inspection provides inspectors with information on the entry and exit requirements for inspecting task documents, insures consistent evaluations across inspections and reduces the effort required during the entry readiness evaluation step of the planning stage 56 of an inspection. The data defining the evaluation criteria are entered by the user through the user interface 32. The history analyzer 34 is also operable to generate a recommended list of entry, exit and reinspection evaluation criteria for the task document class of interest. Table 4 in Appendix D, herein incorporated by reference in it's entirety, shows an exemplary reinspection evaluation checklist which includes reinspection evaluation criteria.

The initialization stage 52 concludes with the creation of project inspection process standards and checklists, such as the exemplary reinspection evaluation criteria checklist shown in Table 4 in Appendix D, which are to be used by potential authors in creating target task documents for the classes of target task documents that will be inspected. The checklists include the relevant evaluation criteria and defect types with default severities for the particular task document class.

Potential authors use these checklists as guides when creating documents of the particular task document class using the document generator 37 in the document creation stage 54. It is contemplated that the document generator 37 includes a word processor or text editor such as WordPerfect. Thus, through the document generator 37, the author generates a target task document which is to be inspected in accordance with the present invention as further detailed hereinbelow.

After the document creation stage 54, and prior to the inspection stage 58, is the planning stage 56. During the planning stage 56, the user reviews and refines, if necessary, the evaluation criteria (entry readiness, reinspection and exit), the defect severities, defect types, default defect severities, and the perspectives. The evaluation criteria, defect severities, defect types, default defect severities and perspectives are modified by the user using the refiner 36 which is operable to customize data associated with the task document class to the target task document in accordance with past inspection results of other target task documents in the some task document class. Any modifications that should be considered for all future inspections (in general or for the particular task document class) are flagged.

After the planning stage 56 is the inspection stage 58. During the inspection stage 58, one or more inspectors, which may include the user and the authors, analyze the target task document for potential defects, questionable items and improvement suggestions. Certain defect types are detected by the document analyzer 38 before inspection of the target task document by the inspectors. Although the target task document is analyzed by the inspectors, it is contemplated that an expert system could be implemented which would be operable to automate some, if not all, of the inspection tasks performed by the inspectors during the inspection stage 58 in accordance with facts and rules of the particular process implemented in the target task document and stored in it's knowledge base.

During the inspection stage 58, each inspector enters all items detected through the user interface 32 to an inspector's log form using the document analyzer 38. An exemplary inspector's log form is shown in Table 5 in Appendix E, herein incorporated by reference in it's entirety. Each inspector also assigns a defect severity and defect code to each item detected. The defect severity assigned may be different from the default defect severity associated with the defect code. The information logged for each item detected includes the defect severity, the assigned defect type or defect code, the number of occurrences of the defect, and the location of the defect in the target task document being inspected and is stored in the inspection data storage 46.

During the next stage, the logging stage 60, the information logged by each inspector is compiled and tallied to a scribe's log form using the inspection data analyzer 40. An exemplary scribe's log form is shown in Table 6 in Appendix F, herein incorporated by reference in it's entirety.

The items are totaled by defect severity, by defect type and by defect type and severity, and preliminary values for a preliminary defects per unit (DPU) and defects per million opportunities (dpmo) are calculated by the inspection data analyzer 40. These preliminary values, or metrics, are then used by the inspection data analyzer 40 to make an objective reinspection evaluation recommendation based on the logged items. The metrics facilitate initial reinspection recommendations based on quantitative data about the quality of the target task document rather than on an individual inspectors' feelings and perceptions. The metrics also provide an early indicator of the probability that a reinspection of the target task document will be necessary.

After the logging stage 60 is the causal analysis stage 62. During the causal analysis stage 62, using the inspection data analyzer 40, selected defects are analyzed using a Pareto analysis of the frequency of a certain defect type or the criticality of a certain defect type. The values determined by the inspection data analyzer 40 in the logging stage 60 are also used by the inspection data analyzer 40 to select the defect items for which causal analysis will be most beneficial. When appropriate, i.e., when historical inspection data is available, the defect counts (in terms of DPU and dpmo) are used by the inspection data analyzer 40 to assess the effectiveness of process improvements previously made but not yet completely evaluated.

Recommended changes to the inspection process are also made by the inspection data analyzer 40 in the causal analysis stage 62 in accordance with the current inspection data. When recommending process changes, how each recommended process change will be verified (change verification criteria such as number of defects, dpmo, DPU, etc.) is also defined. If necessary, the reinspection evaluation criteria are refined accordingly.

Also during the causal analysis stage 62, the effectiveness of prior recommended process changes (using the change verification criteria defined with the process change) is also evaluated if the DPU and dpmo metrics from this inspection provide meaningful information about the effectiveness of the change. The process changes evaluated may impact the document creation stage 54 (as indicated by the dpmo) or the inspection stage 58 or both.

After performing causal analysis on selected defect types and/or defect severities during the causal analysis stage 62, the task document, using the inspection data analyzer 40, is modified in the rework stage 70 in which the author, using the document generator 37, modifies the target task document in accordance with the items in the scribe's log from the logging stage 60. As the author completes the rework and takes appropriate action for each defect, question and improvement suggestion logged, the author also revises the defect severity and the defect type to reflect the author's own evaluation. At the end of the rework stage 70, the defect totals by defect severity, by defect type, and by defect type and defect severity are recalculated by the inspection data analyzer 40.

After the rework stage 70, the totals are then used by the inspection data analyzer 40 to perform a reevaluation in the reinspection stage 64. The determination made by the inspection data analyzer 40 in the reinspection stage 64 is based on the reinspection evaluation criteria, and the estimated number of defects (by defect severity, defect type and density) that remain in the task document. Using the reinspection evaluation criteria and the final tallies from the rework stage 70 facilitates on objective reinspection in the reinspection stage 64 rather than one based on feelings and perceptions (e.g., I think the quality is good enough, I think the important defects have been fixed).

As a result of the evaluation done in the reinspection stage 64, the target task document may, as determined at decision block 68, be reinspected by returning to the planning stage 56 and repeating the stages that follow or be deemed to have passed inspection.

During the exit evaluation stage 72, the target task document is evaluated in terms of the exit evaluation criteria to determine whether all the stages have been completed and the task document is ready for further use.

The final step for target task documents which are deemed to have passed inspection is to report results in the report results stage 76 using the report generator 42. During the report results stage 76, the time spent during the inspection process, the final defect totals Coy defect severity and defect type), the DPU and the dpmo are stored to the inspection data storage 46 for use in trend analysis. The final totals may also be used for statistical process control of the inspection process (from the document creation stage 54 through the exit evaluation stage 72), and for statistical quality control of the target task document. Finally, the total can be used to evaluate the return on investment or cost of conducting the inspection.

An exemplary application of the present invention is the inspection of a semiconductor process specification. Defect types, defect severities, and entry, reinspection and exit criteria are stored to the definitions data storage 44 during the initialization stage 52. The data is refined by the refiner 36 during the planning stage 56 to customize it to the particular semiconductor process in the specification. The document analyzer 38 inspects the specification for defects, etc. in accordance with the data during the inspection stage 58 and the semiconductor processing knowledge base included in the document analyzer 38. If, for example, one of the processing steps uses a chemical not normally used in semiconductor processing, this inconsistency is noted as a defect, a questionable item, or a suggestion for improvement. The defects, questionable items, and suggestions for improvement are logged and tallied during the logging stage 60 and used, in the inspection data analyzer 40 during the causal analysis stage 62, to generate reinspection recommendations and changes to the specification creation and inspection processes. If, using the reinspection criteria entered by the user in the initialization stage 52 and as refined in the planning stage 56, the specification does not pass inspection, the specification is modified in the rework stage 70 in accordance with the defects, questionable items, and suggestions for improvement found during the inspection stage 58 and final tallies are generated. Documents which do not pass a reinspection evaluation in the reinspection stage 64 repeat the inspection process staring at the planning stage 56.

Although the present invention has been described in detail, it should be understood that various charges, substitutions and alterations can be made thereto without departing from the spirit and scope of the present invention as defined by the appended claims.

APPENDIX A

TABLE 1

Example of Defect Severifies Definition
Defect Severities and Definitions Standard

| Defect Severity | Code | Definition |
| --- | --- | --- |
| Critical | C | Defect which could cause a degree of project failure (including technical content and standards violations)<br>• Overlooks a major part of the process.<br>• Would result in not doing what the customer wants.<br>• Makes the processor procedure unusable. |
| Major | M | Defect which could cause economic loss, contract breach, or annoyance (including technical content and standards violations)<br>• Requirements v. recommendations not correct.<br>• Activities associated with the wrong phase; not aligned with<br>• the division's product development process.<br>• Leads to workaround or rework - impacts productivity |
| Minor | N | Defect which does not affect technical meaning but could lead to problem or a bad reflection on the project (including personal preference)<br>• Causes irritation. |
| Question | ? | Question to the author about some aspect of the task document (may become a defect, improvement or may be resolved) |
| Improvement Suggestion | I | Suggestions for improvements to a process (work product creation or inspection process) |

APPENDIX B

TABLE 2

Example of Defect Types Definition with Default Severities
Defect Types and Definitions Standards

| Defect Type | Default Severity | Defect Code | Definition |
|---|---|---|---|
| Clarity | Major (M) | C1 | • Meaning is unclear. |
|  | Major (M) | C2 | • Meaning is ambiguous. |
|  | Minor (n) | C3 | • Passive voice is used rather than active voice. |
|  | Minor (n) | C4 | • Verbose. |
|  | Minor (n) | C5 | • Main points not highlighted. |
|  | Major (M) | C6 | • Flow of information incorrect or hard to use. |
| Format | Minor (n) | F1 | • Format is incorrect. |
|  | Minor (n) | F2 | • Format is inconsistent. |
| Graphic | Major (M) | G1 | • Graphics are incorrect with respect to content. |
|  | Minor (n) | G2 | • Graphics are inconsistent within the task document. |
|  | Major (M) | G3 | • Graphics are inconsistent with associated text. |
|  | Major (M) | G4 | • Graphics are incorrect with respect to standards. |
|  | Minor (n) | G5 | • Appearance not correct. |
| Punctuation | Minor (n) | P1 | • Punctuation is incorrect. |
| Spelling | Minor (n) | SP1 | • Word is misspelled. |
| Structure | Major (M) | ST1 | • Organization is incorrect. |
|  | Critical (C) | ST2 | • Section is missing. |
|  | Major (M) | ST3 | • Organization is confusing. |
| Style | Major (M) | S1 | • Project style guide is not followed. |
|  | Major (M) | S2 | • Project template is not followed. |
|  | Minor (n) | S3 | • Style is inconsistent within the task document. |
|  | Minor (n) | S4 | • Preferred style is not used. |
|  | Major (M) | S5 | • Acronyms improperly, inconsistently or incorrectly used. |
| Technical | Critical (C) | T1 | • Technical content is incorrect, misleading or incomplete. |
|  | Critical (C) | T2 | • Techincal content is inconsistant within the task document. |
|  | Critical (C) | T3 | • Technical content is inconsistent with the source documents. |
|  | Critical (C) | T4 | • Requirements are not feasible. |
|  | Major (M) | T5 | • Recommendations are not feasible. |
|  | Major (M) | T6 | • Technical content is irrelevant |
|  | Major (M) | T7 | • Emphasis or detail is improper. |
|  | Major (M) | T8 | • Requirement is not verifiable. |
| Wording | Minor (n) | W1 | • Wording contains incorrect grammar. |
|  | Minor (n) | W2 | • Wording is inconsistent within the task document |
|  | Major (M) | W3 | • Wording is awkward or hard to understand. |

APPENDIX C

TABLE 3

Example of Perspectives Definitions

Perspectives Checklist By Perspective

| Perspective | Defect Type | Defect Code | Default Severity | Defect Definition |
|---|---|---|---|---|
| Activity Process (SME-1) | With respect to the division's, project's and team's established process for this type of activity: | | | |
|  | Clarity | C5 | n | † Main points are not highlighted. |
|  | Technical | T1 | C | † Technical content is incorrect, misleading or incomplete. |
|  |  | T3 | C | † Technical content is inconsistent with the established activity process. |
|  |  | T6 | M | † Technical content is irrelevant. |
|  |  | T7 | M | † Emphasis or detail is improper. |
| Project Process (SME-2) | With respect to the division's product development process and the project's established process: | | | |
|  | Clarity | C5 | n | † Main points are not highlighted. |
|  | Graphic | G1 | M | † Graphics are incorrect with respect to content. |

TABLE 3-continued

Example of Perspectives Definitions

| | | | | | |
|---|---|---|---|---|---|
| | | G3 | M | | † Graphics are inconsistent with associated text. |
| | Technical | T1 | C | | † Technical content is incorrect, misleading or incomplete. |
| | | T3 | C | | † Technical content is inconstant with the established product process. |
| Quality (QE) | Verifiable, auditable process: | | | | |
| | Clarity | C1 | M | | † Meaning is unclear. |
| | | C2 | M | | † Meaning is ambiguous. |
| | Technical | T2 | C | | † Technical content is inconsistent within the task document. |
| | | T8 | M | | † Requirement is not verifiable. |
| | Wording | W2 | n | | † Wording is inconsistent within the task document. |
| Engineer (Eng) | User/follower of the process as defined in the task document. | | | | |
| | Clarity | C1 | M | | † Meaning is unclear. |
| | | C2 | M | | † Meaning is ambiguous. |
| | | C4 | n | | † Verbose. |
| | | C6 | M | | † Flow of information is incorrect or hard to use. |
| | | C7 | M | | † Wording is awkward or hard to understand. |
| | Structure | ST3 | C | | † Organization is confusing. |
| | Technical | T4 | C | | † Requirements are not feasible. |
| | | T5 | M | | † Recommendations are not feasible. |
| | | T6 | M | | † Technical content is irrelevant. |
| Documenta-tion (Doc) | With respect to use of clear, correct English and the defined templates style: | | | | |
| | Clarity | C3 | n | | † Passive voice is used rather than active voice. |
| | Format | F1 | n | | † Format is incorrect. |
| | | F2 | n | | † Format is inconsistent. |
| | Graphic | G2 | n | | † Graphics are inconsistent within the task document. |
| | | G3 | M | | † Graphics are inconsistent with associated text |
| | | G4 | M | | † Graphics are incorrect with respect to standards. |
| | | G5 | n | | † Appearance is not correct. |
| | Punctuation | P1 | n | | † Punctuation is incorrect. |
| | Spelling | SP1 | n | | † Word is misspelled. |
| | Structure | ST1 | C | | † Organization is incorrect. |
| | | ST2 | C | | † Section is missing. |
| | Style | S2 | M | | † Project template is not followed. |
| | | S3 | n | | † Style is inconsistent within the task document. |
| | | S5 | M | | † Acronyms are improperly used. |
| | Wording | W1 | n | | † Wording contains incorrect grammar. |
| | | W2 | n | | † Wording is inconsistent within the task document. |
| Project Leader (PL) | With respect to customer and project needs: | | | | |
| | Technical | T1 | C | | † Technical content is incorrect, misleading or incomplete. |
| | | T4 | C | | † Requirements are not feasible. |
| | | T5 | M | | † Recommendations are not feasible. |

Perspectives Checklist By Defect Type

| Defect Type | Defect Code | Default Severity | Defect Definition | Perspective |
|---|---|---|---|---|
| Clarity | C1 | M | † Meaning is unclear. | Eng, QE |
| | C2 | M | † Meaning is ambiguous. | Eng, QE |
| | C3 | n | † Passive voice is used rather than active voice. | Doc |
| | C4 | n | † Verbose. | Eng |
| | C5 | n | † Main points not highlighted. | SME-1, SME-2 |
| | C6 | M | † Flow of information incorrect or hard to use. | Eng |
| | W3 | M | † Wording is awkward or hard to understand. | Eng |
| Format | F1 | n | † Format is incorrect. | Doc |
| | F2 | n | † Format is inconsistent. | Doc |
| Graphic | G1 | M | † Graphics are incorrect with respect to content. | SME-2 |

TABLE 3-continued

Example of Perspectives Definitions

|  |  |  |  |  |
|---|---|---|---|---|
|  | G2 | n | † Graphics are inconsistent within the task document. | Doc |
|  | G3 | M | † Graphics are inconsistent with associated text. | Doc, Eng |
|  | G4 | M | † Graphics are incorrect with respect to standards. | Doc |
|  | G5 | n | † Appearance not correct. | Doc |
| Punctuation | P1 | n | † Punctuation is incorrect. | Doc |
| Spelling | SP1 | n | † Word is misspelled. | Doc |
| Structure | ST1 | C | † Organization is incorrect. | Doc |
|  | ST2 | C | † Section is missing. | Doc |
|  | ST3 | C | † Organization is confusing. | Eng |
| Style | S1 | M | † Project style guide is not followed. | not assigned |
|  | S2 | M | † Project template is not followed. | Doc |
|  | S3 | n | † Style is inconsistent within the task document. | Doc |
|  | S4 | n | † Perferred style is not used. | not assigned |
|  | S5 | M | † Acronyms improperly used. | Doc |
| Technical | T1 | C | † Technical content is incorrect, misleading or incomplete. | SME-1, SME-2, PL |
|  | T2 | C | † Technical content is inconsistent within the task document. | QE |
|  | T3 | C | † Technical content is inconsistent with the source documents. | SME-1, SME-2 |
|  | T4 | M | † Requirements are not feasible. | PL, Eng |
|  | T5 | M | † Recommendations are not feasible. | PL, Eng |
|  | T6 | M | † Technical content is irrelevant. | SME-1, Eng |
|  | T7 | M | † Emphasis or detail is improper. | SME-1 |
|  | T8 | M | † Requirement is not verifiable. | QE |
| Wording | W1 | n | † Wording contains incorrect grammar. | Doc |
|  | W2 | n | † Wording is inconsistent within the task document. | Doc, QE |

APPENDIX D

TABLE 4

Example of Reinspection Evaluation Checklist with Criteria
Reinspection Evaluation Checklist Moderator's Name: _____  Date of Evaluation: _____

Author's Name: _____  Evaluation Results: _____

Task Document: (pass/accept as is/fail) _____  Revision/Date: _____

Type of Product: _____

(requirements, design, test, plan, contract, standards, source code, pseudo-code, checklists, reports, . . .)

METRICS

|  | Author | Moderator | Total Time for Evaluation |
|---|---|---|---|
| Start Time (hh:mm) | _____ | _____ | _____ |
| Stop Time (hh:mm) | _____ | _____ | _____ |
| Total Time (minutes) | _____ | _____ | _____ |

RISKS
Risks of proceeding with inspection process when the Evaluation Results = accept as is:

_____
_____
_____
_____

Yes/No   Criteria To Be Met

1. The total percent of task document that was reworked does not exceed 25%.

TABLE 4-continued

Example of Reinspection Evaluation Checklist with Criteria
Reinspection Evaluation Checklist Note: The following criteria are based on latent defects.
2. The total number of latent defects does not exceed 1.25 per page.
Note: When first implementing inspection, a more reasonable number might be 6-10 per page.
3. The number of latent critical defects does not exceed 0.25 per page.
Note: When first implementing inspection, a more reasonable number might be 1-2 per page.
4. The number of latent major defects does not exceed 0.25 per page.
Note: When first implementing inspection, a more resonable number might be 2-3 per page.
5. The number of latent minor defects does not exceed 1 per page.
Note: When first implementing inspection, a more reasonable number might be 3-5 per page.
6. The number of latent defects of defect type TECHNICAL does not exceed 0.25 per page.

APPENDIX E

TABLE 5

Example of Information Recorded by Inspector during Individual Analysis
INSPECTOR'S LOG FORM Task Document: unit 0900     Inspector: Ruth Less     Date: 14 December 1993     Page: 1 of 2

| Page | Line/Para | Defect Type | Defect Severity | No. Occurrences | Description/Keywords |
|---|---|---|---|---|---|
| 1 | 9 | T1 | C M̲ N ? I | 2 | Wrong name of project document. |
| 2 | 22 | F1 | C M̲ N ? I | 1 | Footer information incorrect. |
| 2 | 25 | S1 | C M̲ N ? I | 1 | Should be in line 2, not line 25. |
| 4 | 5 | T3 | C̲ M N ? I | 1 | Wording inconsistent with source document |
| 4 | 7 | T1 | C M N ?̲ I | 1 | Who has approval authority? |
| 7 | 27–28 | T1 | C̲ M N ? I | 1 | Activities not correlated to process stages correctly. |
| 11 | 15 | S1 | C M N̲ ? I | 1 | No heading for table column. |
| 12 | 7 | T1 | C M N ?̲ I | 1 | Is this the correct reference? |
| 15 | 9 | T1 | C M N̲ ? I | 1 | Missing reference. |
| 19 | 5 | W1 | C M N̲ ? I | 1 | Should not end phrase with a preposition ("for"). |
| | Totals for sheet | | 2:3:4:2:0 | | |

C - Critical   M - Major   N - Minor   ? - Question to Author   I - Improvement Suggestion
Analysis Start Time: 8:25__ (hours:minutes) Stop Time: 10:30__ (hours:minutes) Total Time: __ 125_____ (minutes)
Analysis Totals by Severity: C: 6____ M: 3____ N: 4____ ?: 5____ I: na____

APPENDIX F

TABLE 6

Example of Inspection Log at end of Logging Meeting

SCRIBE'S LOG FORM
Task Document: Unit 0900_____ Moderator: Ima Leader_____ Date: 16 December 1993____ Page: 1 of 13__

| Page | Line/Para | Defect Type | Inspector's Severity | No. Occur. | New Item? | Description/Keywords | Final Severity | Final Type | Disposition |
|---|---|---|---|---|---|---|---|---|---|
| 1 | 9 | T1 | C M N ? I | 2 | | Wrong name of project document. | C M N | | |
| 1 | 17 | C1 | C M N ? I | 1 | | Missing word, Unclear phrase. | C M N | | |
| 2 | 22 | F1 | C M N ? I | 1 | | Footer information incorrect. | C M N | | |
| 2 | 25 | S1 | C M N ? I | 1 | | Should be in line 2, not 25. | C M N | | |
| 3 | 5, 22 | C4 | C M N ? I | 2 | | Wording repeats unnecessarily and is inconsistent w/source doc. | C M N | | |
| 3 | 19C | S3 | C M N ? I | 1 | X | "4" is boldface, not regular type. | C M N | | |
| 4 | 5 | T3 | C M N ? I | 1 | | Wording inconsistent with source document. | C M N | | |
| 4 | 7 | T1 | C M N ? I | 1 | | Need CEO's signature. | C M N | | |
| 4 | 15A, B, C | T1 | C M N ? I | 3 | | Missing table entries. | C M N | | |
| 5 | 2 | P1 | C M N ? I | 1 | | ' missing in "Instruments" | C M N | | |
| | Total for sheet | | 1:7:6:0:0 | | | | : : | | |

C - Critical  M - Major  N - Minor  ? - Question to Author  I - Improvement Suggestion
Totals:
Item Logging: Observed: C: 31__ M: 47__ N: 62__ ?: 3__ I: na__  No. new items: 27____ Estimated Latent: C: 13__ M: 20__ N: 25__
Rework: Observed: C: ___M: ___ N: ___ ?: ___ I: ___  Estimated Latent: C:___ M: ___ N: ___
Tast Document DPU: _____  Task Document creation process dpmo: _____

SCRIBE'S LOG FORM Final Page
Task Document: Unit 0900_____ Moderator: Ima Leader_____ Date: 16 December 1993____ Page: 13 of 13__

| Defect Type | Item Logging Severity Tallies | | | | | Final Severity Tallies | | |
|---|---|---|---|---|---|---|---|---|
| | Critical | Major | Minor | Questions | Improvements | Critical | Major | Minor |
| C1 | /// | /////// | | | | | | |
| C2 | // | // | | | | | | |
| C3 | //// | / | // | | | | | |
| C4 | | //// | | | | | | |
| F1 | / | /// | ////////// | / | | | | |
| F2 | | | ///// | | | | | |
| S1 | | //////// | // | | | | | |
| S2 | | | //////// | | | | | |
| S3 | | // | | / | | | | |
| S4 | | / | | | | | | |
| T1 | /////// | //// | | | | | | |
| T2 | /// | ////// | | | | | | |
| T3 | ///// | // | / | / | | | | |
| T4 | /// | | | | | | | |
| P1 | | | //// | | | | | |
| G1 | G2 | | 1/ | /////// | | | | | |
| W1 | W2 | | | ///// \ ///// | | | | | |
| Totals by severity | 31 | 47 | 62 | 3 | NA | | | |

What is claimed is:

1. A method for in-process inspecting a target task document in one or more task documents classes to detect and remove defects while the task document is being created, comprising the steps of:
 (a) predefining defect severities, defect types, evaluation criteria and perspectives for each of said predefined task document classes;
 (b) generating said target task document in accordance with said predefined defect severities, defect types, evaluation criteria and perspectives defined for each of said predefined task document classes;
 (c) refining said defect severities, said defect types, said evaluation criteria and said perspectives defined for said associated task document class in response to said generating step to generate refined defect severities, refined defect ,types, refined evaluation criteria and refined perspectives;
 (d) inspecting said target task document in accordance with said refined defect severities, said refined defect types and said refined perspectives to find defects in said target task document;
 said step (d) includes the step of inspecting said target task document for questionable items and suggestions for improvement;
 (e) analyzing said defects in accordance with refined evaluation criteria to determine whether said target task document passes inspection;
 (f) generating reinspection recommendations if said target task document does not pass inspection in response to said analyzing step;
 (g) reworking said target task document in accordance with said defects found in step (d);
 (h) repeating steps (c)–(g) in accordance with said reinspection recommendations until said target task document passes inspection;
 (i) generating tallies and statistical metrics of said defects in response to said inspecting step; and (j) generating process improvement recommendations in response to said tallies and statistical metrics;

said step (j) includes the step of evaluating previous process improvement recommendations in accordance with said tallies and said statistical metrics and in accordance with previously stored tallies and previously stored statistical metrics.

2. The method of claim 1 wherein step (c) includes the step of refining said defect severities, said defect types, said evaluation criteria and said perspectives in accordance with said process improvement recommendations.

3. A system for in-process inspecting a target task document in one or more task document classes to detect and remove defects while said document is being created, comprising:

- a set of predefined severities, defect types evaluation criteria and perspectives for each one of said task document classes;
- a user interface;
- a first document generator coupled to said user interface for generating said target task document in accordance with said predefined defect severities, defect types, evaluation criteria and perspectives predefined for said task document classes;
- a refiner coupled to said user interface for refining defect severities, defect types, evaluation criteria and perspectives defined by a user through said user interface to generate refined defect severities, refined defect types, refined evaluation criteria and refined perspectives;
- a second document generator coupled to said user interface for generating said target task document in accordance with said refined defect severities, said refined defect types, said refined evaluation criteria and said refined perspectives;
- a document analyzer coupled to said user interface for analyzing said target task document in accordance with said refined evaluation criteria to generate detected defects in said target task document;
- an inspection data analyzer coupled to said user interface for generating tallies, statistical metrics, and reinspection recommendations in accordance with said detected defects;
- a history analyzer coupled to said user interface for analyzing previously stored tallies, previously stored statistical metrics and previously stored process improvements to assist said user in defining said defect severities, said defect types, said evaluation criteria and said perspectives; and
- a report generator coupled to said user interface for generating reports including said detected defects, said tallies, said statistical metrics and said reinspection recommendations to a user.

\* \* \* \* \*